Jan. 10, 1956  S. J. KLEIN  2,730,222
CONVEYER ROLLER
Filed July 14, 1953
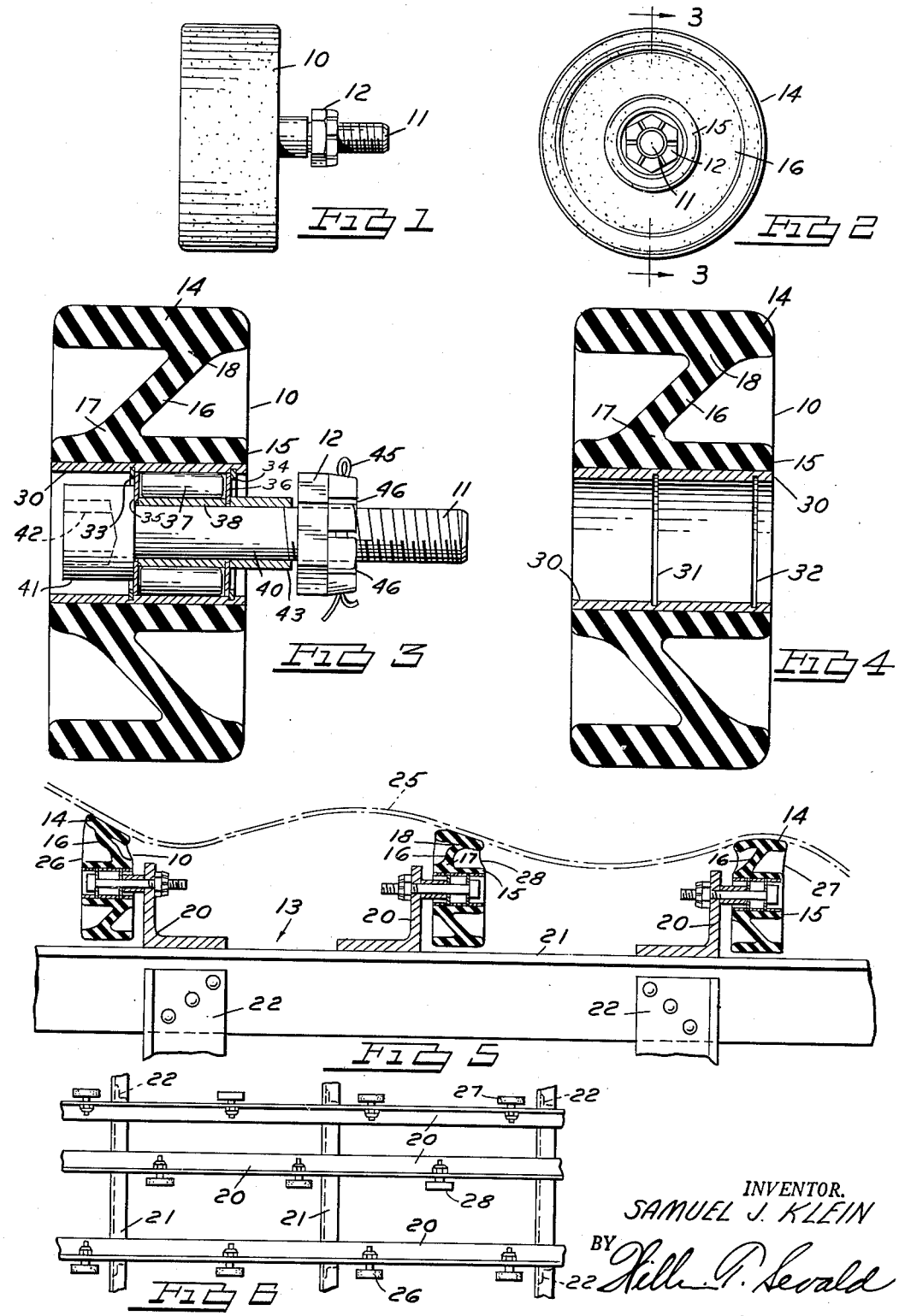
INVENTOR.
SAMUEL J. KLEIN
BY
ATTORNEY

United States Patent Office 2,730,222
Patented Jan. 10, 1956

2,730,222
CONVEYER ROLLER
Samuel J. Klein, Detroit, Mich.

Application July 14, 1953, Serial No. 367,789

4 Claims. (Cl. 193—37)

This invention relates to conveyer rollers and more particularly to an improved supporting and conveying roller which is capable of providing firm, resilient support for an object, which is readily deformable under load so as to conform to the shape of the object being supported by the roller, and which is mounted in a manner which assures the roller being constantly fully rotatable.

The improved roller of this invention embodies a structural form which permits it to support an object by the elasticity of the roller material so that when the roller is placed under a load, the forces acting on the roller material are more tensile in nature rather than purely compressive as has heretofore been the custom.

Prior art roller conveyers have been made up from a plurality of rollers which are usually longitudinally aligned and laterally staggered so as to provide points of continual support for an object being passed over the rollers. The roller conveyers are particularly advantageous for carrying from one stage of operation to another such items as automobile body elements as, for example, hoods, door panels, trunk lids, tops, and the like, and refrigerator side panels and door panels, and the carrying of fuselage skin sections during aircraft manufacture. The rollers of the prior art conveyers have utilized resilient material for the actual supporting area of the roller because it is necessary that the roller be yieldable to prevent damage to the article being transported thereover. The resilient material of the rollers has customarily been rubber or rubber like material but the construction of the rollers has been of a type wherein the resistance to deformation under a load progressively increases as the load is applied with the result that the roller material becomes compacted and hard.

Various forms of conveyer rollers exist in the prior art such as those made from a resilient material having upstanding ridges separated by circumferential grooves and those made from a material such as sponge rubber. When these rollers are used to support an object, however, they are loaded in compression with the result that the roller material is compacted, increasing the resistance to deformation and this increased resistance to deformation of the roller material causes a relatively hard roller which results in a high number of faulty objects which must be either reworked or rejected.

In addition to the problem presented by the compacting of the roller material, conveyer roller manufacturers must provide a freely rotatable roller as the defects of rollers are magnified when the rollers become jammed so as to be unable to revolve freely because a jammed roller results in scratching or scarring of the conveyed object in addition to the denting or dinging caused by the hardness of the roller. In the roller of the instant invention, however, the defects in the prior art rollers as noted are completely eliminated and at the same time a much more durable roller is provided which is mounted in a manner to assure free rotation of the roller.

With the foregoing in view, it is an important object of this invention to provide a conveyer roller which is readily deformable under load and conformable to the shape of the object being carried thereby.

Another object of the invention is to provide a readily distortable conveyer roller which may be made from suitable material having the desired characteristics of strength and durability.

Another object of the invention is to provide a conveyer roller having a tough and resistant-to-penetration supporting surface yet which is readily conducive to being distorted to conform to the shape of the article being carried over the conveyer.

A further object of the invention is to provide a conveyer roller whose hardness does not progressively increase under the load of an object supported thereby.

A further object of the invention is to provide a conveyer roller adapted to support an object thereon with the forces on the roller caused by the weight of the object being mainly tensile in nature rather than compressive whereby the roller material is not compacted into a harder mass but remains substantially as resilient under load as it was prior to the application of the load.

An additional object of the invention is to provide a mounting for the conveyer roller which will provide a constantly freely rotatable roller.

These and other objects of the invention will be specifically pointed out or will become apparent from a reading of the following specification considered in conjunction with the accompanying drawing in which:

Fig. 1 is a front elevational view of the conveyer roller;

Fig. 2 is a side elevational view of the conveyer roller;

Fig. 3 is a cross-sectional view of the conveyer roller and its mounting means taken along the line 3—3 of Fig. 2;

Fig. 4 is a cross-sectional view similar to Fig. 3 but with the mounting means removed;

Fig. 5 is a fragmentary end view of a typical roller conveyer equipped with the novel roller and illustrating the manner of deformation of the roller to conform to the shape of the article being conveyed on the rollers; and Fig. 6 is a fragmentary top plan view of the roller conveyer illustrated in Fig. 5.

Referring now to the drawing wherein like numerals represent like and corresponding parts throughout the several views, the embodiment of the novel roller shown therein to illustrate the invention comprises essentially a resilient, wheel-like body 10 rotatably journalled on a spindle 11 which is threaded at one end for reception of a jam nut 12 adapted to secure the roller to a conveyer frame 13.

More particularly, the conveyer roller comprises a resilient, wheel-like body 10 which, although preferably an integral structure, may be said to be formed from an outer annular tread 14 and an inner, concentric, annular hub 15, the tread 14 and the hub 15 being connected together by an inclined or canted flange or web 16 cantilevered from the hub 15 so that one half of the roller has the appearance of a Z in cross-section. The juncture 18 of the inclined web 16 with the annular tread 14 is axially removed beyond the juncture 17 of the web 16 with the annular hub 15 so that the two junctures are radially out of alignment enabling a force directed vertically downwardly on the tread 14 to reflect the web 16 downwardly toward the hub 15, tensioning the web at the juncture points 17 and 18, with the stress being distributed along the radial length of the web 16. The deflection of the web 16 results in the load imposed by the weight of an object being absorbed obliquely with the juncture points 17 and 18 acting as return springs tending to restore the deflected web to its original canted position. The roller body is not subjected to the compacting which would result from pure compression loading, and consequently, the roller does not become "hard" under loads but remains resilient and, therefore, can absorb the shock of an object being violently placed thereon without damage to the object.

Should an irregularly shaped object be presented to the roller, the roller will be able to conform readily to the contour of the object placed thereon because of the flexibility of the tread 14 and the inclined web 16. This feature is illustrated in Fig. 5 wherein 3 rows of rollers are supported in a staggered manner on angle irons 20 mounted on cross bars 21 which are bolted or riveted to floor engaging studs 22. An object 25 is shown in Fig. 5 as spanning the distance between the two edge rollers 26 and 27 and being supported by edge rollers 26, 27 and by center roller 28. Object 25 is not designed to represent any particular structure but is representative merely of an object having an irregular configuration to illustrate the deformation of the several rollers when subjected to various types of surface configurations as may be expected to be encountered when the rollers are used in industry.

Roller 26 represents the deformation of the body 10 when subjected to a force which might be encounted when the rollers are used to convey such objects as automobile hoods, or tops, or other structures which are generally U- or V-shaped. In this instance the tread 14 of the body is inclined sharply downwardly at its forward or free edge while the web 16 is deflected and somewhat buckled at its mid-portion. Where a V-shaped object is supported by the roller 26, the weight of the object will tend to wrinkle the web 16 as shown in Fig. 5 and the tread 14 of the body will be stressed about its juncture point 18 so as to lie practically flat along the surface of the object and the object will be supported both vertically and laterally mainly by the resilience of the web 16 which is stressed about points 17 and 18 and deflected toward the hub.

The other edge roller 27 in Fig. 5 is more nearly subjected to a purely vertically applied force by the object 25 and it will be noted that web 16 is inclined toward annular hub 15 providing vertical support without increased roller hardness since there is relatively no compacting of the roller material. Roller 27 also illustrates the manner in which the tread 14 becomes crowned or deformed to conform to the curvature of the object 25 supported thereon.

Roller 28 represents a loading in between those represented by rollers 26 and 27. That is, roller 28 is stressed approximately equally vertically and laterally with the result that the web 16 is inclined toward annual hub 15, flexing about juncture points 17 and 18 and is also slightly wrinkled or buckled near its middle. In roller 28, the tread 14 is also crowned although not as completely as it is in roller 27.

It will now be apparent that the novel conveyer roller herein disclosed provides both lateral and vertical support for an object, the roller readily conforming substantially to the configuration of the surface being carried thereby and the resiliency of the roller material being unimpaired due to the fact that the roller material is not compacted under the pressure exerted by the conveyed object.

The novel rollers as herein disclosed may be manufactured from the customary plastic, rubber, or rubber-like materials heretofore used in the production of conveyer rollers and the specific type material used in any given roller will be governed by the use to which that roller is to be put. The important advantage realized by the instant roller construction is that customarily used materials are utilized in such a manner that the material is not progressively hardened by being compacted under the weight of an object being supported by the roller. Since the roller material is not subjected to the compacting-hardening forces, objects may be supported on and conveyed by the rollers without fear of damage being caused by the rollers.

The novel conveyer roller may be used to replace those already in use and may be mounted in any suitable manner. Not all prior art mounting means have been entirely satisfactory, however, as some of them have demonstrated a propensity to freeze with the result that a roller becomes non-rotatable and causes scratches and scars in an object which of necessity must slide over the jammed roller. To enable the most beneficial results to be obtained from the instant roller, therefore, a preferred mounting means has been incorporated therein which will not be subject to the objection noted during ordinary use.

The mounting means includes a cylindrical, seamless bearing retainer 30 which is bonded in any suitable manner to the inner periphery of annular hub 15. The inner periphery of bearing retainer 30 is circumferentially scored or grooved as at 31, 32 in two places inwardly of its ends into which grooves a pair of snap or retaining rings 33, 34 are adapted to be positioned.

Adjacent retainer ring 33 a thrust washer 35 is positioned and adjacent retainer ring 34 a second thrust washer 36 is provided and between thrust washers 35, 36 is revolubly contained a plurality of roller bearings 37 positioned between cylindrical inner race 38 and bearing retainer 30. Note that thrust washers 35 and 36 bear against the edges of inner race 38 which is somewhat longer than roller bearings 37 thereby enabling the bearings 37 to be axially loosely disposed between their race and retainer. The radially outer edges of the thrust washers 35, 36 are, of course, held in position by retainer rings 33, 34 as will be apparent from Fig. 3.

Through the cylindrical inner race 38 the spindle 11 is inserted and in the form shown in the drawing spindle 11 comprises a bolt 40 having its head 41 disposed within the cylindrical bearing retainer 30 and adapted to bear against thrust washer 35. The head 41 of the bolt may be provided with a multiple sided recess 42 into which a correspondingly sided wrench may be inserted if desired. The shank of the bolt 40 projects beyond the edge of the roller and is equipped with a collar or spacer 43 which fits snugly around the shank and is adapted to bear at its inner end against thrust washer 36 and at its outer end against the flange of angle iron 20 as illustrated in Fig. 5. The end of the bolt shank is adapted to project through an aperture in the angle iron 20 and is threaded for reception of a nut 12 adapted to be screwed onto the bolt 40 on the opposite side of angle iron 20.

To install the roller on the conveyor support, the threaded end of the bolt 40 is projected through the aperture in the angle iron and the nut 12 is turned thereon until it jams against the side of angle iron 20. The spacer 43 and the bolt head 41 will bear against the thrust washers 36 and 35, respectively, which in turn will bear against opposite ends of inner race 38. To prevent the jam nut from working loose, a cotter pin 45 may be inserted through a pair of slots 46 in the jam nut 12 and also through a slot in bolt 40.

The mounting means just described provides a highly complementary support for the roller body of this invention for the reason that the jam nut may be turned very tightly against angle iron 20 to position the roller positively and securely in place on the conveyer frame 13 without danger of damaging the bearing races as is frequently the situation where other forms of mounting means are utilized. Because the bearings are relatively free from the possibility of becoming jammed when the roller is installed on the conveyer frame, free revolution of each of the novel rollers is practically assured with the result that the possibility of damage to an object due to a frozen roller is practically eliminated.

The invention has been shown and described in considerable detail but it is obvious that various modifications and adaptations may be made within the spirit and scope of the appended claims wherein the invention is defined.

I claim:

1. A conveyer roller for providing support for an object, said roller comprising a body having an annular tread, an annular hub concentric with said tread, and a supporting universally deformable web interconnecting said tread and said hub, said web interconnecting said tread and said hub along a line inclined to the vertical, said web being joined to said tread and said hub intermediate the edges thereof whereby the edges of said tread are free enabling said tread to conform to the shape of an object supported by said roller.

2. A conveyer roller adapted to provide a support for an object, said roller comprising a body having an annular tread, an annular hub concentric with said tread, and a supporting web interconnecting said tread and said hub; said web interconnecting said tread and said hub along a line inclined to the radial so as to be readily shearwise deflectable upon the application of a load to said tread.

3. A deformable individual conveyor roller for use in conjunction with a plurality of like rollers to make a resilient beltless roller conveyor comprising a rotatably mounted hub portion, an annular tread portion concentrically disposed relative to said hub portion in radially spaced relationship thereto, and a single supporting web portion disposed between said hub portion and said tread portion at an angle to the radial so that no radius of said hub or tread can travel said assembly without interruption thereby eliminating the possibility placing the material of the roller under compression from a radial angle.

4. A shearwise deformable individual conveyor roller for use in conjunction with a plurality of like rollers to make a resilient beltless roller conveyor comprising a rotatably disposed hub portion of resilient material, an annular tread portion of resilient material concentrically disposed around said hub in spaced relationship thereto, and a supporting and interconnecting web portion of resilient material disposed between said hub and said tread on an angle to the radial and to the cylinders of said hub and tread so that no radius of said roller lies within the material of said hub, web, and tread so that said web shearwise supports said tread on said hub relative to radially directed forces.

References Cited in the file of this patent
UNITED STATES PATENTS

| | | |
|---|---|---|
| 1,286,343 | Kendall | Dec. 3, 1918 |
| 2,007,910 | Stephens | July 9, 1935 |
| 2,169,623 | Weiss et al. | Aug. 15, 1939 |
| 2,651,398 | McGraw | Sept. 8, 1953 |

FOREIGN PATENTS

| | | |
|---|---|---|
| 814,865 | France | Mar. 30, 1937 |